US008695780B2

(12) United States Patent
Lanfranchi

(10) Patent No.: US 8,695,780 B2
(45) Date of Patent: Apr. 15, 2014

(54) DEVICE FOR ARRANGING PLASTIC CONTAINERS WITH ONE OR MORE DEVICES FOR BLOWING DOWN CONTAINERS OVERLYING ERECTING MEANS

(75) Inventor: Mario Lanfranchi, Collecchio PR (IT)

(73) Assignee: Lanfranchi S.r.l., Collecchio (Parma) (IT)

( * ) Notice: Subject to any disclaimer, the term of this patent is extended or adjusted under 35 U.S.C. 154(b) by 101 days.

(21) Appl. No.: 13/303,562

(22) Filed: Nov. 23, 2011

(65) Prior Publication Data

US 2012/0128458 A1    May 24, 2012

(30) Foreign Application Priority Data

Nov. 24, 2010 (IT) .................. PR10A0085

(51) Int. Cl.
    B65G 29/00    (2006.01)
    B65G 47/24    (2006.01)
(52) U.S. Cl.
    USPC ............... 198/397.04; 198/384; 198/397.03; 198/397.02; 198/382
(58) Field of Classification Search
    USPC ............... 198/373, 382, 384, 391, 392, 396, 198/397.01, 397.02, 397.03, 397.04, 493; 414/755
    See application file for complete search history.

(56) References Cited

U.S. PATENT DOCUMENTS

| 3,119,487 A | 1/1964 | Charles et al. | |
| 3,643,783 A | 2/1972 | Sterling | |
| 3,650,368 A * | 3/1972 | Nalbach | 198/397.05 |
| 3,710,920 A * | 1/1973 | Sterling | 198/380 |
| 4,479,573 A * | 10/1984 | Ackley et al. | 198/399 |
| 5,065,852 A | 11/1991 | Marti | |
| 5,419,442 A * | 5/1995 | Wright, Jr. | 209/682 |
| 5,549,189 A | 8/1996 | Martisala | |
| 7,258,222 B2 | 8/2007 | Marti Sala | |

FOREIGN PATENT DOCUMENTS

| EP | 0 432 081 | 6/1991 |
| EP | 0 629 571 | 12/1994 |
| EP | 1 650 143 | 4/2006 |
| FR | 2 655 631 | 6/1991 |
| WO | 20081129086 | 10/2008 |

OTHER PUBLICATIONS

Italian Search Report dated Jul. 1, 2011, corresponding to the Foreign Priority Application No. IT PR20100085.

* cited by examiner

Primary Examiner — Leslie A Nicholson, III

(74) Attorney, Agent, or Firm — Young & Thompson

(57) ABSTRACT

The present invention refers to the field of devices for arranging containers enabling the correct positioning of containers or bottles made of plastic on the bottling feeding line. The device (1) for arranging plastic containers (100) with one or more devices for blowing down the containers (101) overlapped on the erecting elements, includes a cylindrical hopper (17) inwardly provided with a conical or flat base, conveying elements (19) and erecting-aligning elements, and includes one or more blowing elements (2), for example blowers, adapted to inwardly blow, adjacent to the upper edge of the hopper (17) aligning elements, an air flow for hitting possible containers (101) overlying other containers located on the erecting elements themselves.

4 Claims, 4 Drawing Sheets

DEVICE FOR ARRANGING PLASTIC CONTAINERS WITH ONE OR MORE DEVICES FOR BLOWING DOWN CONTAINERS OVERLYING ERECTING MEANS

FIELD OF THE INVENTION

The present invention refers to the field of plastic containers arranging devices which enable the correct positioning of containers or bottles made of plastic on the bottling feeding line.

For example, said arranging devices can be of a type having an elevator aligning system capable of raising and erecting bottles having any shape and stability, or of a type having blades sliding behind an helicoidal elevating guide.

In the elevator arranging devices, the containers, preferably made of plastic, are randomly distributed in a cylindrical hopper, then they are erected with their mouth upwardly and arranged in an ordered row on a belt conveyor exiting the machine.

The rotating cylindrical hopper is inwardly provided with a conical base for rolling the containers towards the side inner wall of the hopper.

There are conveying means for taking the horizontal containers to the upper edge of the hopper, and the erecting-aligning means, outside the hopper located in a gap between the hopper itself and an outer stationary cylinder coaxial to the hopper.

Said conveying means comprises elevators, rotating integrally with the hopper and which are vertically movable from a initial loading position to a final unloading position, and means for driving said elevators.

It is known, for preventing the plastic containers from overlying the erecting means, which can cause the jamming of the arranging device itself, the use of compressed air jets which blow down the excess containers again in the hopper.

Unfortunately, this step is performed both with a high energy consumption and with a high level of noise.

DISCLOSURE AND ADVANTAGES OF THE INVENTION

It is an object of the invention to overcome the above-mentioned disadvantages by providing an arranging device having a blowing element, for example a blower, capable of eliminating possible excess containers overlying other containers located on the erecting means by striking them with a pressurized air flow.

Said blowing element enables to reduce the energy consumption because the process fluid (air) is subjected to a pressure and density increase smaller than the increase imparted by a compressor to a process fluid.

Meanwhile, said blowing element ensures a lower level of noise than a nozzle blowing pressurized air.

Therefore, the advantage consists of preventing the containers from overlying the erecting means by using a technology which requires less energy, and therefore which is less expensive and noisy.

Said object and advantages are all met by a device for arranging plastic containers by one or more devices for blowing down the containers overlying the erecting means, object of the present invention, which is characterized for what is provided in the attached claims.

BRIEF DESCRIPTION OF THE FIGURES

This and other characteristics will be better understood by the following description of a preferred embodiment shown in an exemplifying and non-limiting way in the following drawings.

DESCRIPTION OF THE INVENTION

Figure 1:
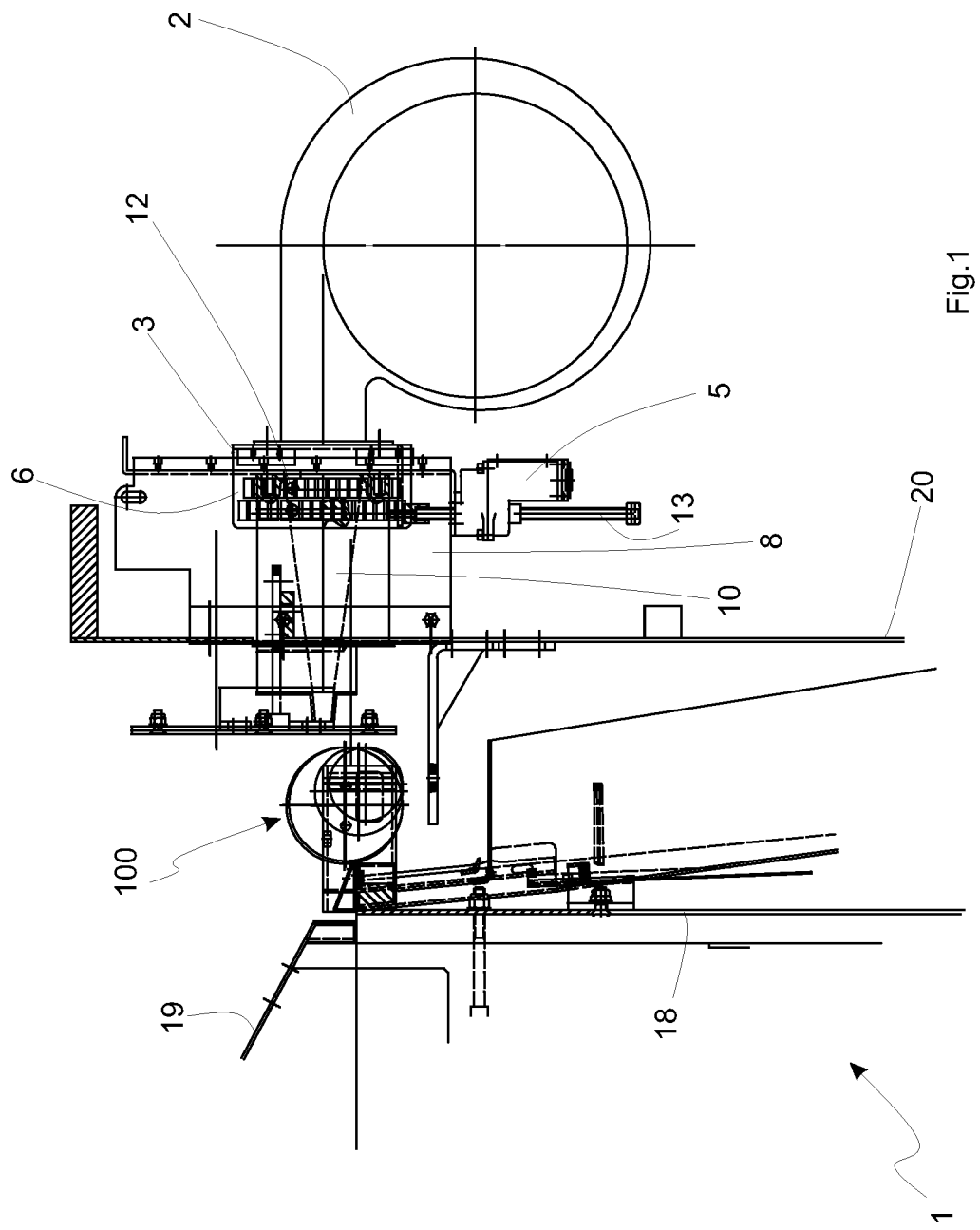
FIG. 1: shows a particular view of the arranging device.

Referring to the figures, 1 generally indicates a device for arranging plastic containers 100 with one or more devices for blowing down containers 101 overlying the erecting means.

Said arranging device 1, of the known type, is briefly formed by:
   a known cylindrical rotating hopper 17 receiving bulk containers 100 inwardly provided with a conical or flat base for enabling the containers 100 to roll towards the side inner wall 18 of the hopper 17;
   conveying means 19 for horizontally conveying the containers 100 to the upper edge of the hopper 17, wherein the containers are taken by:
   means for erecting and aligning the containers 100, located externally to the hopper 17 in a gap between the rotating hopper 17 and an outer stationary cylinder 20 coaxial to the hopper.

To the outer side of the arranging device 1, adjacent to the upper edge of the same, one or more blowing elements 2, for example blowers, are attached by an element 3, which is movable by guiding means 4 and a driving device 5.

Said blowing element 2 delivers a pressurized air flow into the arranging device 1 for striking by said flow possible containers 101 overlying the containers located on the erecting means.

Generally, the term "blower" means an operative machine capable of transferring energy to a work fluid (air) by a pressure increase.

By this, it is to be noted that the blower subjects the fluid to a pressure and density increase smaller than the one obtainable by a compressor.

In the shown example, the movable element 3 is a generally U-shaped plate having a rim 14 bent under the plate itself.

Said movable element 3 can vertically move by guiding means formed by two rails 7 integral to a box-shaped sheet 8 and two slides 9, integral to the movable element 3, engaging said rails 7.

The vertical movement of the movable element 3, and consequently of the blowing element 2, is obtained by using the driving device 5 connected to the rim 14 of the movable element 3 by a threaded stem 13 and attached to the lower side of the box-shaped sheet 8.

Figure 3:
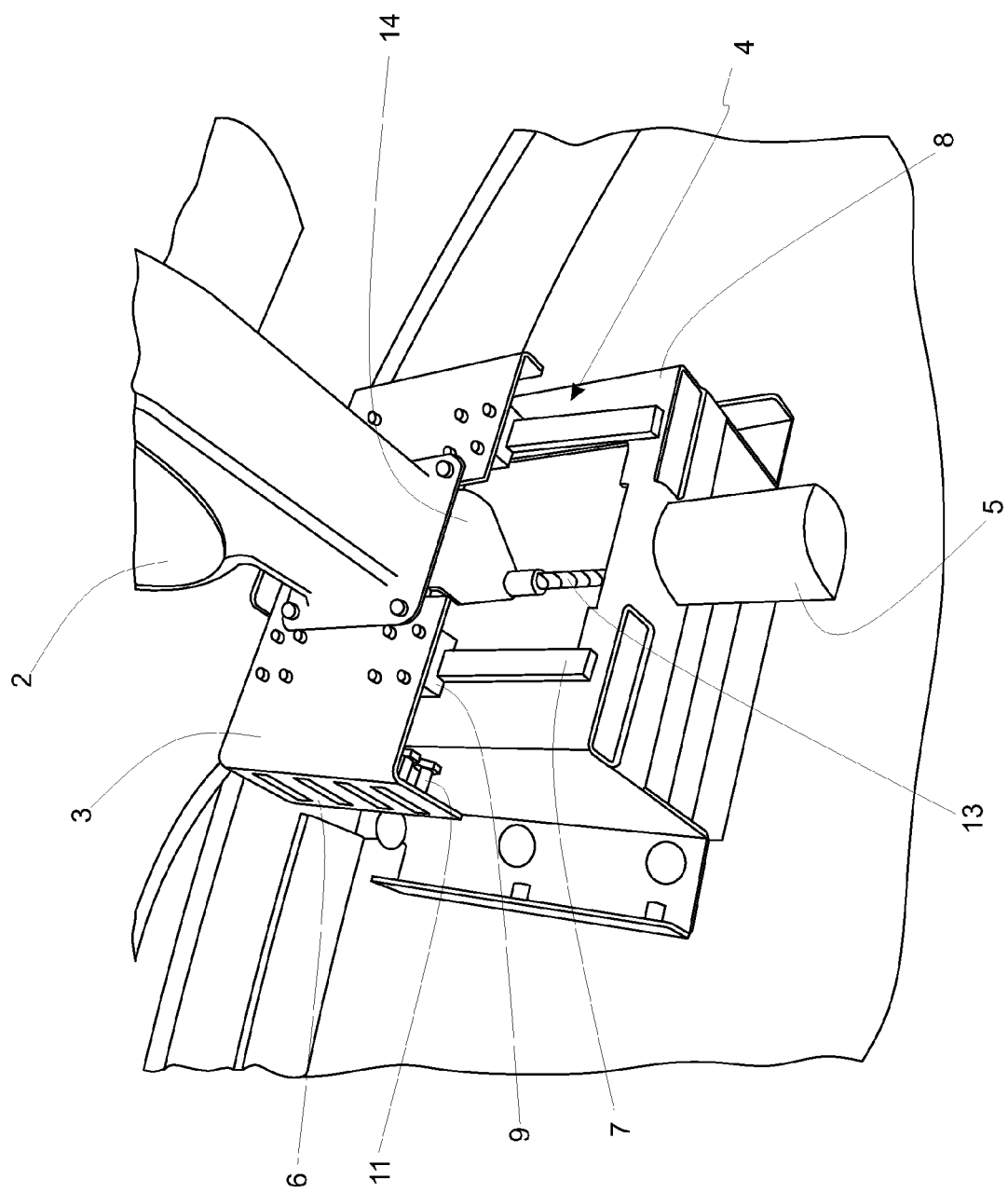
FIG. 3: shows a perspective view of a detail of the device.

Said movable element 3, as shown in FIGS. 1 and 3, has a grid-shaped side 6 located at the side of the box-shaped sheet, supporting at its top at least one position sensor 12, for example of the inductive type, which determines the stop of the movable element 3, and at its bottom at least a further sensor 11, which is also, for example, of the inductive type, which by detecting the "emptiness/fullness" of the grid-shaped side of the movable element 3, adjusts the pitch of the same.

Figure 2:
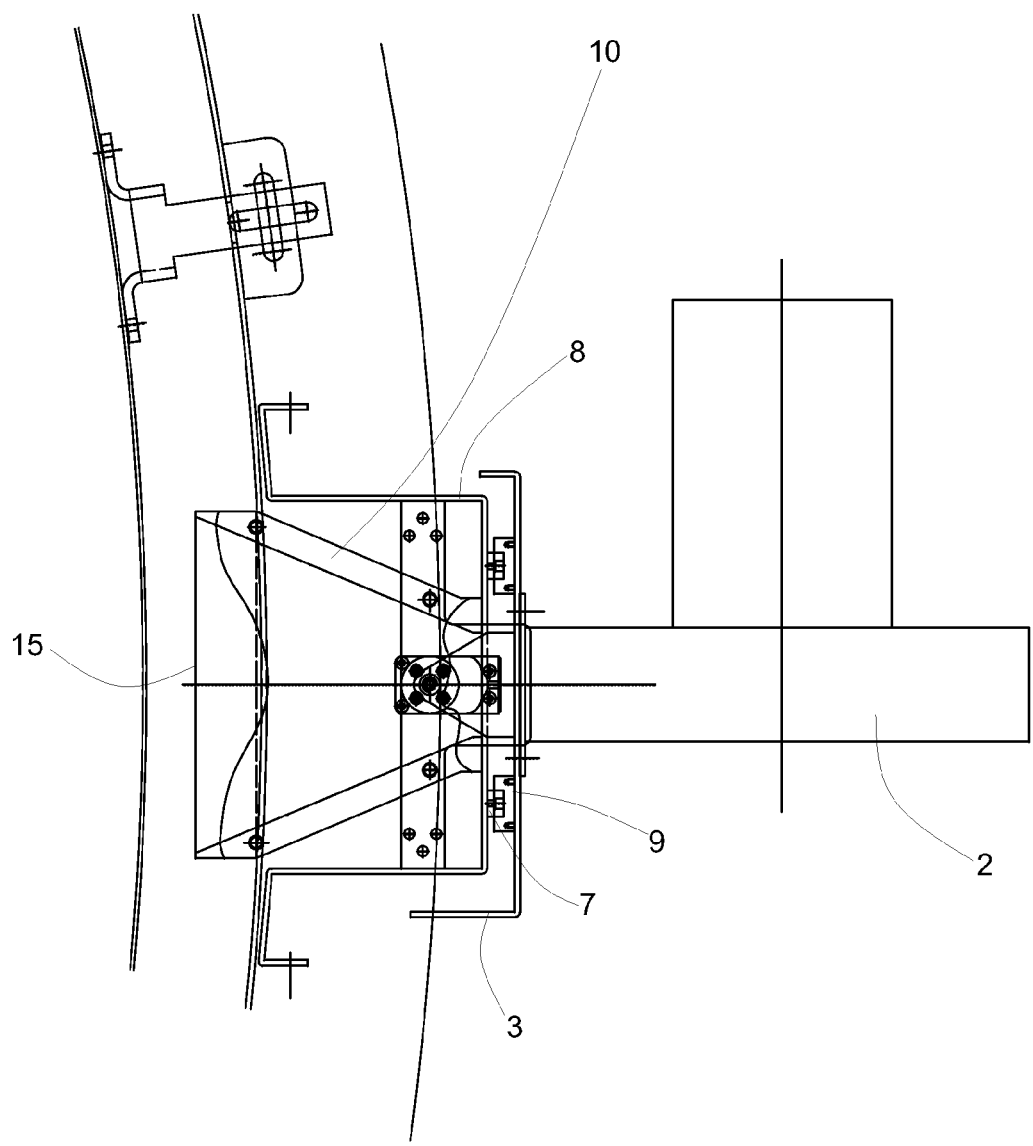
FIG. 2: shows the device of FIG. 1 according to another perspective.

The blowing element 3 has, at its end, a connecting chamber 10 having a variable cross-section which means, as shown in FIGS. 1 and 2, that, along its extension it flattens in the vertical plane and widens in the horizontal one.

Figure 4:
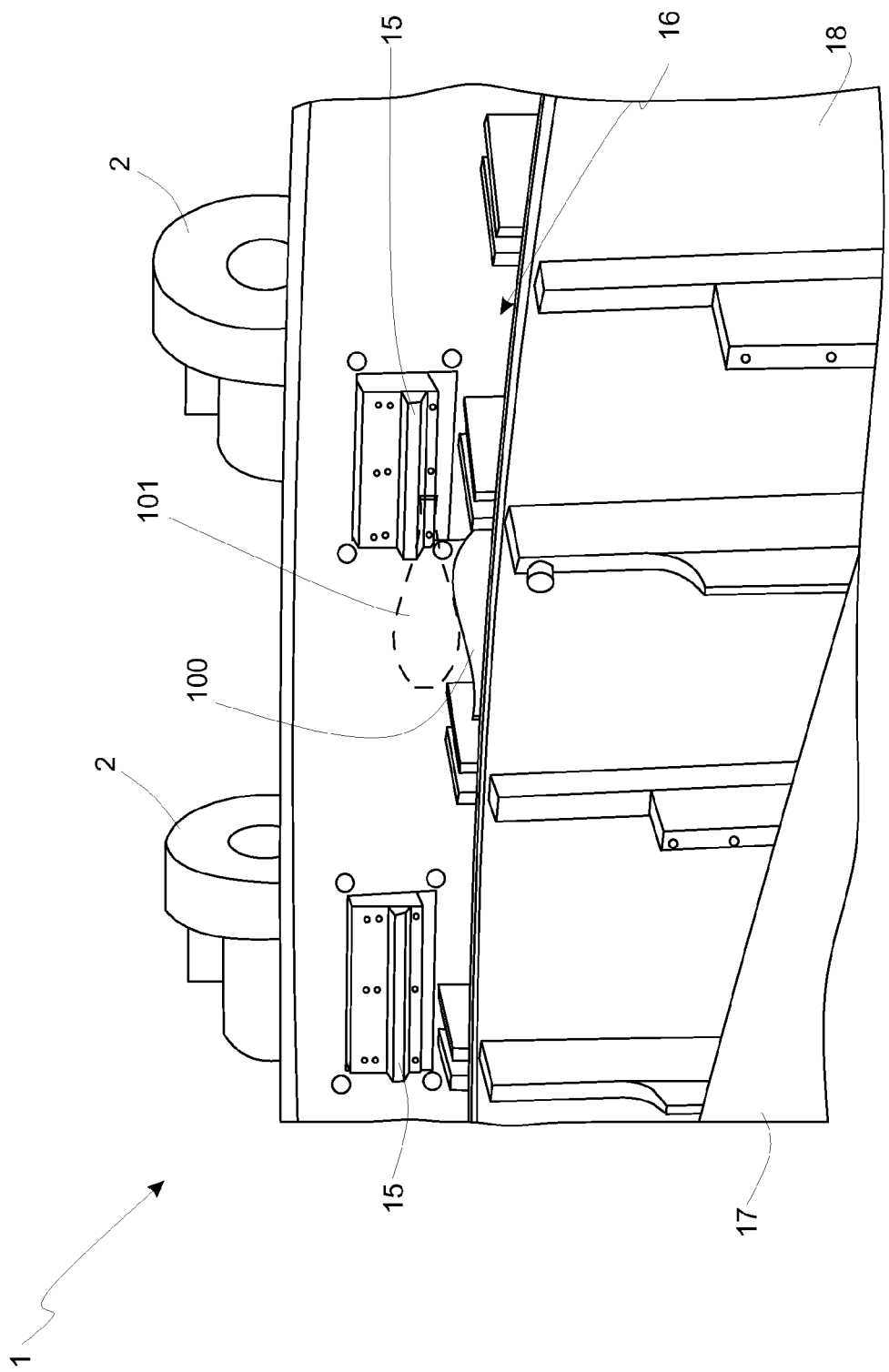
FIG. 4: shows a perspective view of a detail of the inside of the arranging device.

The mouth 15 of said chamber 10 ends inside the arranging device 1, as shown in FIG. 4, and approximately corresponds to a volume 17 receiving the horizontal container 100 after being taken to a level corresponding to the one of the upper edge of the hopper 17 by the conveying means 19.

Anyway, it is to be noted that the length of the mouth 15 of the chamber 10 is fixed, while the length of the volume 16 varies as a function of the length of the processed containers 100.

Operatively, the blowing element 2, and consequently the mouth 15 of the connecting chamber 10, is positioned before actuating the arranging device 1, at a predetermined height as a function of the diameter of the containers 100 to be arranged.

This step is performed by the driving device 5, which through the threaded stem 13, moves the element 3 and locates it in the desired position.

Consequently, the containers 100 are in bulk delivered in the cylindrical hopper 17 and by rolling on it they horizontally fall on the conveying means 19 which horizontally transport them to the upper edge of the hopper 17, wherein the containers are taken by the erecting-aligning means.

If some containers 100 remain on the erecting means, at the volumes 16, the always operative blowing element 2, by a pressurized air flow, strikes down the excess container 101 inside the hopper 17.

The invention claimed is:

1. A device (1) for arranging plastic containers comprising:
    a rotating cylindrical hopper (17) that receives bulk containers (100), said hopper (17) comprising an upper edge and an inner side wall (18), wherein the containers (100) when received by the hopper (17) roll to the side inner wall (18) of the hopper (17);
    a stationary cylinder (20) located coaxial with the hopper (17);
    a conveyor (19) that horizontally conveys the containers (100) to the upper edge of the hopper (17);
    a container erecting-aligning unit arranged outside the hopper (17), in a gap between the hopper (17) and the stationary cylinder (20), wherein container erecting-aligning unit receives the containers (100) from the conveyor (19) such that the containers (100) are located on the container erecting-aligning unit with some of the containers (101) overlying the containers (100) located on the container erecting-aligning unit;
    a blowing element (2) that feeds a ventilated air flow into the hopper (17), the blowing element (2) comprising an upper edge that intercepts the containers (101) overlying the containers (100) located on the container erecting-aligning unit;
    a movable element (3); and
    an attachment element (8) that attaches the blowing element (2), via the movable element (3) to an outer side of the stationary cylinder (20), adjacent an upper edge of the stationary cylinder (20),
    wherein the movable element (3) is vertically displaceable along a guide part (4) and an actuator device (5),
    wherein said blowing element (2) has a variable cross-section connecting chamber (10) that expands in a horizontal plane along a length direction and flattens in a vertical plane along the length direction.

2. The device (1), according to claim 1, wherein the movable element (3) is a generally U-shaped plate with a first major surface and at least one bent plate having a grid-shaped side extending from the first major surface and having a rim (14) bent under the first major surface, the rim (14) being operatively connected to the actuator device (5) and the first major surface being guided by the guide part (4).

3. The device (1), according to claim 2, wherein,
    the attachment element comprises a box sheet (8) attached to the stationary cylinder (20), and
    the guide part (4) comprises at least one track (7) integral with a back side of the box sheet (8) and a runner (9), integral with the movable element (3) and engaging said at least one track (7).

4. The device (1), according to claim 3, wherein,
    the actuator device (5) is connected to the rim (14) of the movable element (3) by a threaded stem (12) and is fixed to a lower side of the box sheet (8).

* * * * *